US010443673B2

(12) United States Patent
Förster

(10) Patent No.: US 10,443,673 B2
(45) Date of Patent: Oct. 15, 2019

(54) FREQUENCY-DEPENDENT DAMPING VALVE ARRANGEMENT

(71) Applicant: ZF FRIEDRICHSHAFEN AG, Friedrichshafen (DE)

(72) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 152 days.

(21) Appl. No.: 15/315,694

(22) PCT Filed: Apr. 27, 2015

(86) PCT No.: PCT/EP2015/059013
§ 371 (c)(1),
(2) Date: Dec. 1, 2016

(87) PCT Pub. No.: WO2015/185275
PCT Pub. Date: Dec. 10, 2015

(65) Prior Publication Data
US 2018/0187738 A1 Jul. 5, 2018

(30) Foreign Application Priority Data
Jun. 5, 2014 (DE) .................. 10 2014 210 704

(51) Int. Cl.
*F16F 9/34* (2006.01)
*F16F 9/50* (2006.01)
*F16F 9/348* (2006.01)
*F16F 9/512* (2006.01)

(52) U.S. Cl.
CPC .......... *F16F 9/3488* (2013.01); *F16F 9/3485* (2013.01); *F16F 9/5126* (2013.01); *F16F 2228/066* (2013.01); *F16F 2228/08* (2013.01)

(58) Field of Classification Search
CPC ...... F16F 9/3488; F16F 9/3485; F16F 9/5126; F16F 2228/066
See application file for complete search history.

(56) References Cited

U.S. PATENT DOCUMENTS

| 4,953,671 A | 9/1990 | Imaizumi |
| 5,467,852 A * | 11/1995 | de Kock ................ F16F 9/46 188/266.2 |
| 6,076,548 A * | 6/2000 | Schonfeld ........... F16C 32/0648 137/501 |

(Continued)

FOREIGN PATENT DOCUMENTS

| DE | 14 55 823 | 5/1969 |
| DE | 2359690 | 5/1975 |

(Continued)

*Primary Examiner* — Thomas J Williams
*Assistant Examiner* — James K Hsiao
(74) *Attorney, Agent, or Firm* — Cozen O'Connor

(57) ABSTRACT

A damping valve arrangement for a vibration damper is disclosed. This damping valve arrangement includes a damping piston with a check valve and a control arrangement with a control pot and a control piston that is axially movable therein. The control pot is shaped from a sheet metal has at least one stop that projects into the control space, axially supports the control piston at least indirectly, and defines a soft damping force characteristic. The stop is produced by a plastic deformation of the control pot.

18 Claims, 2 Drawing Sheets

(56) References Cited

U.S. PATENT DOCUMENTS

| | | | | |
|---|---|---|---|---|
| 6,318,523 | B1* | 11/2001 | Moradmand | F16F 9/3482 188/280 |
| 7,070,028 | B2* | 7/2006 | Reybrouck | F16F 9/0209 188/282.8 |
| 2006/0283675 | A1 | 12/2006 | Teraoka et al. | |

FOREIGN PATENT DOCUMENTS

| | | |
|---|---|---|
| DE | 690 05 747 | 7/1994 |
| DE | 44 41 047 | 1/1996 |
| DE | 10 2013 002425 | 4/2014 |
| DE | 10 2014 009 004 | 2/2015 |
| JP | H06-207 636 | 7/1994 |
| WO | WO 2011/040808 | 4/2011 |

* cited by examiner

US 10,443,673 B2

FREQUENCY-DEPENDENT DAMPING VALVE ARRANGEMENT

CROSS REFERENCE TO RELATED APPLICATIONS

This is a U.S. national stage of application No. PCT/EP2015/059013, filed on Apr. 27, 2015. Priority is claimed on German Application No.: DE102014210704.0, filed Jun. 5, 2014, the content of which is incorporated here by reference.

BACKGROUND OF THE INVENTION

1. Field of the Invention

The invention is directed to a damping valve arrangement with a frequency-dependent damping force characteristic.

2. Description of the Prior Art

The object of a vibration damper in a motor vehicle is to damp vibrations excited by the uneven road surface. In this regard, a compromise between driving safety and driving comfort. A vibration damper with a stiff damping valve arrangement having a high damping force characteristic is optimal for highly safe driving. If greater comfort is demanded, the damping valve arrangement should be adjusted to be as soft as possible. It is very difficult to find this compromise in a vibration damper with a conventional, non-electronic damping valve arrangement that is adjustable by an actuator.

Damping valve arrangements with a frequency-dependent damping force characteristic are known in the art that are outfitted with an additional electronic and/or mechanical control and switch an additional damping valve arrangement on or off depending on a compression frequency and/or rebound frequency of the vibration damper.

DE 44 41 047 C1, US 2006 28 36 75 A or US 49 53 671 A may be cited by way of example.

There are also known solutions having a control arrangement arranged at the piston rod coaxial to the damping piston and comprises a control pot and an axially displaceable control piston arranged in the control pot. The control piston axially limits a control space enclosed in the control pot connected to the damping valve arrangement via an inlet connection. A spring element is arranged between the control piston and damping valve, which spring element introduces a spring force axially into the control piston on the one hand and into the damping valve on the other hand. When the control space is filled with damping medium, the control piston displaces in direction of the damping valve and, via the spring element, increases the pressing pressure of the valve disks of the damping valve, which increases the damping force.

However, all known damping valve arrangements stand out as highly complicated, among other reasons because they require highly precise adjustment. In particular, it is difficult to adjust the soft damping characteristic and the hard damping characteristic in these vibration dampers without additional control means.

For example, the soft damping force characteristic could be defined by adding additional spacing elements between the control piston and the pot base of the control pot. For this purpose, however, the control arrangement would have to be disassembled into individual parts and assembled again multiple times under certain circumstances when adjusting the required soft damping force characteristic, so that the manufacturing cycle times which are usually tightly planned could not be adhered to.

SUMMARY OF THE INVENTION

An object of the present invention is to provide a simply constructed, economical damping valve arrangement which has a frequency-dependent damping force characteristic and allows the damping force characteristic to be adjusted in a simple manner.

According to one aspect of the invention, the control pot of the control arrangement in the damping valve arrangement has at least one stop and is shaped from a sheet metal, and the stop, which projects into the control space and axially supports the control piston at least indirectly, is produced by a plastic deformation of the control pot.

The plastic deformation of the control pot for producing a stop, which defines the soft damping force characteristic, can be carried out after assembly of the control arrangement. Therefore, additional spacing elements between the control piston and the bottom of the control pot can advantageously be dispensed with, and the soft damping force characteristic can be adjusted by producing a stop of a defined height.

BRIEF DESCRIPTION OF THE DRAWINGS

The invention will be described more fully with reference to the following description of the drawings. In the drawings.

DETAILED DESCRIPTION OF THE PRESENTLY PREFERRED EMBODIMENTS

Figure 1:
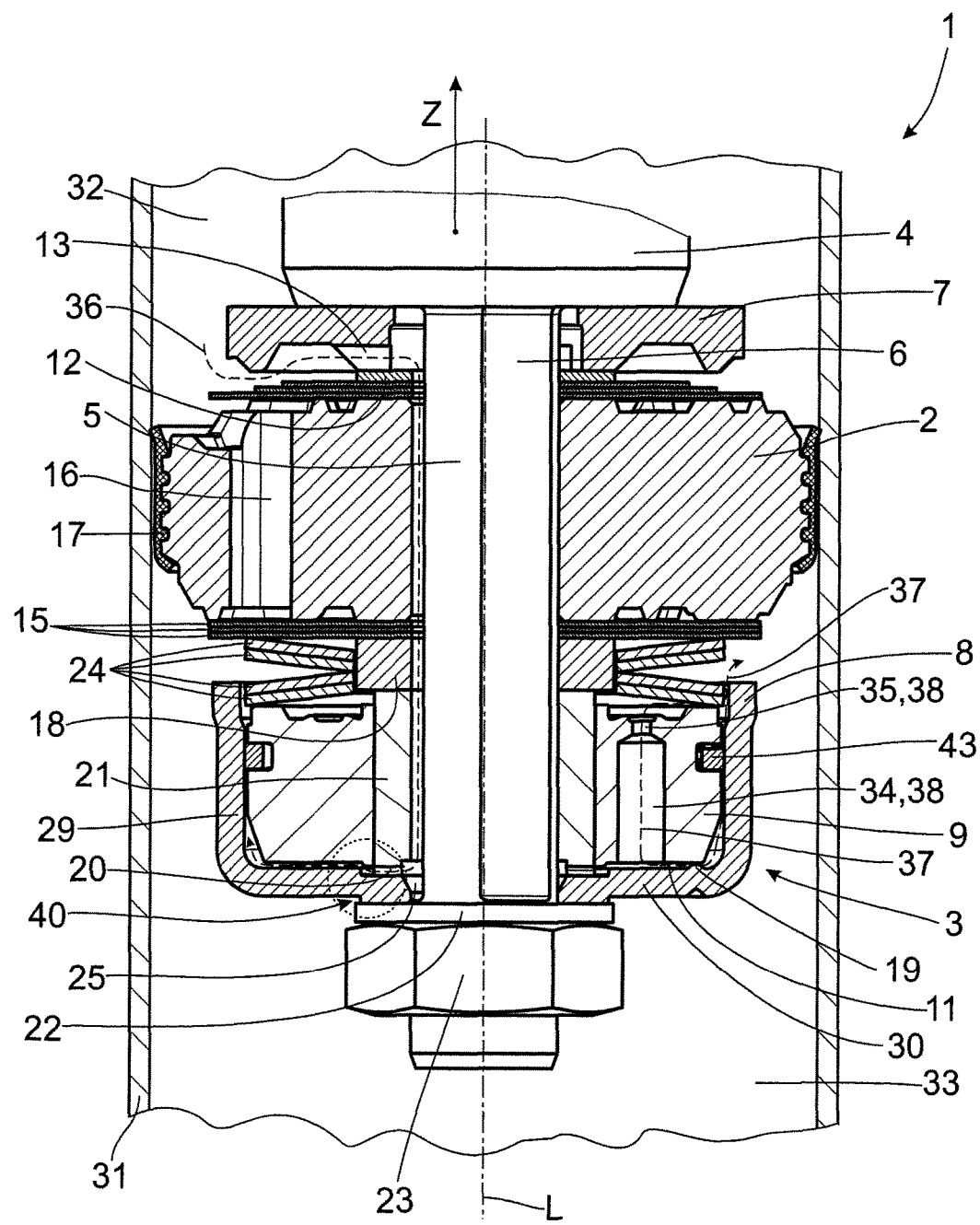
FIG. 1 is a sectional view of an embodiment example of a damping valve arrangement.

FIG. 1 shows an exemplary constructional variant of a damping valve arrangement.

FIG. 1 shows a piston rod 4 which has a piston rod tenon 5. The piston rod tenon 5 is a portion of the piston rod 4 having a reduced diameter. The damping valve arrangement 1 in its entirety is threaded onto the piston rod tenon 5 and is axially clamped between a portion of the piston rod 4, which portion adjoins the piston rod tenon 5 and has a larger diameter than the piston rod 5, and fastener 23, shown in FIG. 1 as a piston rod nut.

As is shown in FIG. 1, the damping valve arrangement 1 comprises a damping piston 2 arranged inside a cylinder 31 filled with a damping fluid and which is axially secured to a piston rod 4. The damping piston 2 is outfitted with a piston seal 17 that radially seals it relative to the cylinder 31. The damping piston 2 is fixed to the piston rod 4, is arranged so as to be axially displaceable together with the piston rod 4 inside the cylinder 31, and divides the interior of the cylinder into a first working space 32 on the piston rod side and a second working space 33 remote of the piston rod 4.

The damping piston 2 is outfitted in each instance with a check valve in each flow direction of the damping fluid. The check valves each comprise at least one flow channel 16 formed in the damping piston 2 and which is covered by at least one valve disk 15. As is shown in the drawings, the flow channels 16 can be covered by a plurality of valve disks 15 that are stacked one upon the other, known as valve disk packages. The quantity, size and shape of the individual valve disks 15 in a valve disk package define the pressing pressure, damping characteristic and damping behavior of a vibration damper.

A control arrangement 3 is arranged at the piston rod 4 coaxial to the damping piston 2, this control arrangement 3 comprising a thin-walled control pot 8 and a control piston 9, which is axially displaceable in the control pot 8. The control pot is shaped from sheet metal. The control piston 9 can be made of a metal, a ceramic material, or a suitable plastic, with or without fiber reinforcement, by cold forming, hot forming, casting, injection molding, turning, or sintering. The control pot 8 has a cylindrical pot wall 29 and a disk-shaped pot base 30 arranged at an end of the control pot 8 remote of the damping piston 2.

On the side facing the check valve, the control piston 9 arranged in the control pot 8 axially limits a control space 11 enclosed in the control pot 8 so that an axial displacement of the control piston 9 inside the control pot 8 changes the volume of the control space 11 in a defined manner.

The damping valve arrangement 1 further has an inlet connection 36 that connects the first working space 32 to the control space 11. In the constructional variant shown in FIG. 1, inlet connection 36 comprises a bypass 6 formed at the piston rod 4, at least one flow recess 13 connecting the bypass 6 to the first working space 32, and at least one inlet choke 20 connecting the bypass 6 to the control space 11.

The damping valve arrangement 1 further has an outlet connection 37 that connects the control space 11 to the second working space 33.

In the constructional variants shown in the drawings, a stop element 18 and a tubular guide bushing 21 are arranged between the damping piston 2 and the pot base 30 of the control arrangement 3.

A spring arrangement 24 in the form of a plurality of disk springs is arranged between the control piston 9 and the check valve. This spring arrangement 24 is axially supported at the control piston 9 on the one hand and at the valve disk 15 of the check valve on the other hand.

Accordingly, the spring arrangement 24 loads the valve disk 15 axially in direction of the flow channel 16 and the control piston 9 in direction of the pot base 30 with a defined spring force. In the constructional variants shown in FIGS. 1 and 2, the spring arrangement 24 comprises a series connection of two disk springs connected in parallel in each instance. Accordingly, the spring force of the spring arrangement 24 can be adjusted through a defined quantity of a plurality of disk springs connected in parallel. The length of travel of the spring arrangement 24 can be defined by the quantity of disk springs connected in series. As used herein, "travel" means the longitudinal extension required by the entire spring arrangement 24 to compress.

The control piston 9 surrounds the guide bushing 21 in circumferential direction and slides axially on the outer surface of the guide bushing 21 during a change in volume of the control space 11. A stop element 18 is clamped between the guide bushing 21 and the damping piston 4 and has a greater outer diameter than the guide bushing 21. The stop element 18 serves as an axial stop for the control piston 9 which limits the axial movement of the control piston 9 in direction of the damping piston 4 and defines the hard damping force characteristic. Beyond this, the stop element 18 takes over the function of a guide for the spring arrangement 24. The spring arrangement 24 surrounds the stop element 18 in circumferential direction.

Further, the control arrangement 3 has a stop 19 formed at the pot base 30 of the control pot 8 through plastic deformation that limits the axial movement of the control piston 9 in direction of the pot base 30 and defines the soft damping characteristic.

A portion 40 with reduced cross section is formed at the pot base 30 and prevents an undefined deformation of the control pot 9 during the production of the stop 19 and/or serves to define the deformation of the control pot 9 for the axial positioning of the stop 19.

When the piston rod 4 and the damping valve arrangement 1 fixed thereto are moved in rebound direction, the damping medium is conveyed into the control space 11. The control piston 9 is displaced and further pre-loads the spring arrangement 24, which is axially supported at the valve disk 15 of the check valve, so that the damping force of the check valve is increased.

During rapid, smaller axial movements of the damping piston 2 inside the cylinder 31, the control space 11 is filled only slightly, or not at all, so that the spring arrangement 24 is not pre-loaded further and the damping force remains at a defined low level. However, during larger, slower axial movements of the damping piston 2 inside the cylinder 31, the integral of the pressure differential of damping fluid pressure on the valve disk 15 to damping fluid pressure in the control space 11 over time is large enough in spite of the throttling resistance of the inlet connection 36 to supply the control space 11 with enough damping fluid so that the control piston 9 pre-loads the spring arrangement 24 until the control piston 9 encounters a stop element 18 arranged between the guide bushing 21 and the valve disks 15 of the check valve. The stop element 18 limits the axial movement of the control piston 9 in direction of the damping piston 2 and accordingly defines the maximum pre-loading of the spring arrangement 24 and, therefore, also the highest damping force characteristic.

Figure 2:
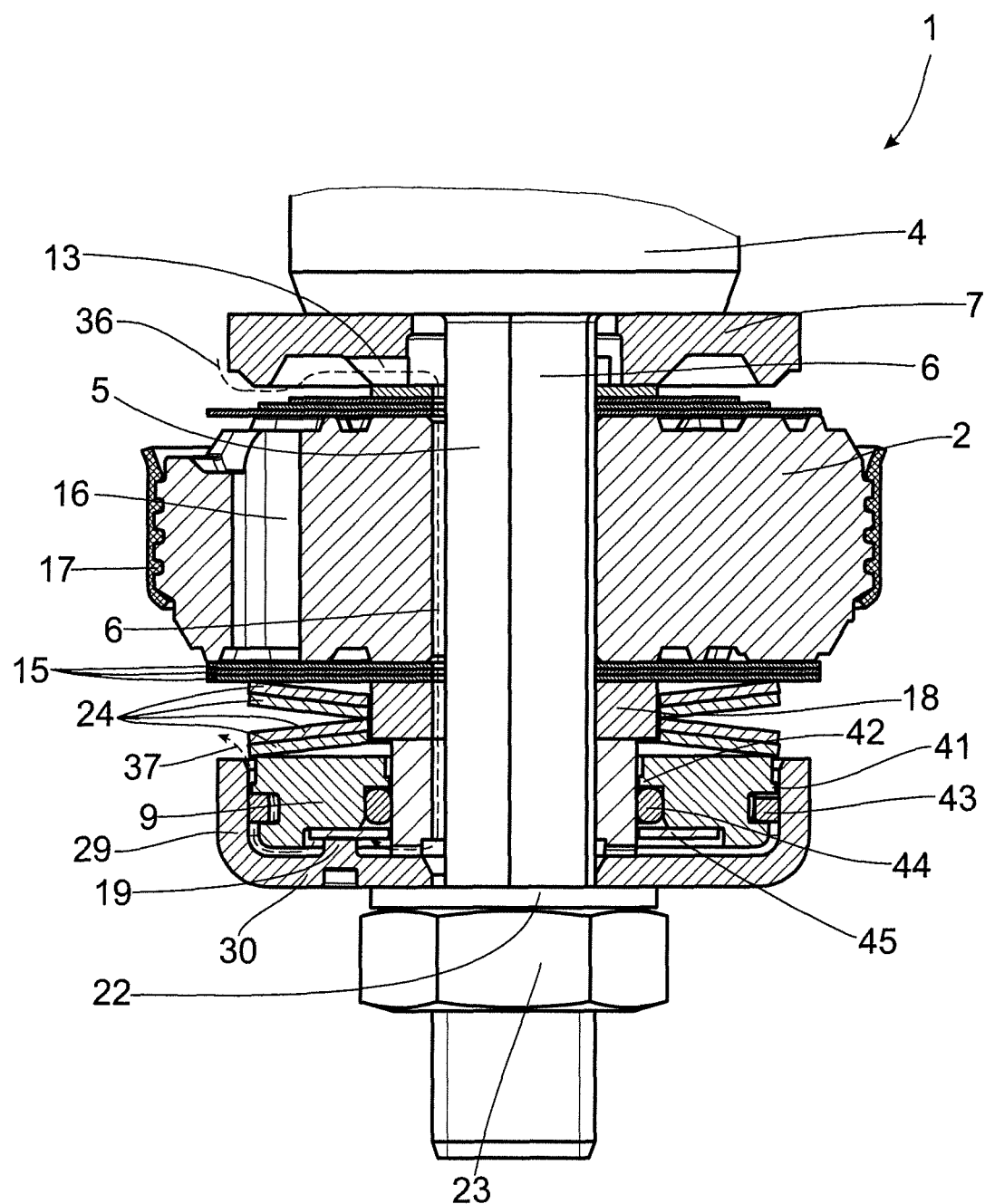
FIG. 2 is a sectional view of an alternative embodiment example of a damping valve arrangement.

The difference between FIGS. 1 and 2 appears in the configuration of the control piston 9. Compared to the control piston 9 shown in FIG. 1, the control piston 9 shown in FIG. 2 has an appreciably shorter overall length and, instead of being slidingly supported at the guide bushing 21, is supported at the latter in a free-floating manner. At its inner diameter, the control piston 9 has a recess that receives a seal ring 44 arranged between the piston rod 4 and the control piston 9. Further, the control piston 9 has an inner extrusion edge 42 arranged at the inner diameter, that protrudes in direction of the piston rod 4, and prevents an extrusion of the seal ring 44 between the control piston 9 and the piston rod 4. A seal ring supporting disk 45 that impedes the seal ring 44 from sliding out axially in direction of the pot base 39 is arranged axially between the control piston 9 and the pot base 30 inside the control space 11.

Beyond this, the control piston 9 has an outer extrusion edge 41 formed in circumferential direction at the control piston 9 that prevents an extrusion of a compensation ring 43 arranged between the control piston 9 and the pot wall 29 of the control pot 9. The compensation ring 43 is made of a plastic and its function is to compensate for manufacturing tolerances of the control pot 8 and the control piston 9. In so doing, the compensation ring 43 permits a defined leakage so that damping medium can escape from the control space 11, the outlet connection 37 being at least partially defined in this way.

The outer extrusion edge 41 and the inner extrusion edge 42 are arranged approximately in a plane considered in axial direction. This allows a defined oblique position of the control piston 9 relative to the guide bushing 21 and relative to the control pot 8 without tilting.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve arrangement for a vibration damper, comprising:
   a cylinder that is at least partially filled with a damping fluid;
   a piston rod;
   an axially displaceable damping piston arranged inside the cylinder, and axially secured to the piston rod that divides the cylinder into a first working space on the piston rod side and a second working space remote of the piston rod;
   at least one flow channel formed in the damping piston;
   at least one valve disk covering the at least one flow channel; and
   a control arrangement arranged at the piston rod coaxial to the damping piston, comprising:
      a sheet metal control pot with a cylindrical pot wall and a disk-shaped pot base arranged at an end of the sheet metal control pot remote of the damping piston;
      an axially displaceable control piston arranged in the sheet metal control pot and that axially limits a control space enclosed in the sheet metal control pot,
      an inlet connection that connects the first working space to the control space;
      an outlet connection that connects the control space to the second working space;
      at least one spring arrangement arranged between the control piston and the damping piston, and configured to load the at least one valve disk axially in direction of the at least one flow channel and the control piston in direction of the disk-shaped pot base with a defined spring force; and
      at least one stop that projects from the disk-shaped pot base into the control space and axially supports the control piston at least indirectly and defines a soft damping force characteristic,
      wherein the at least one stop is produced by plastic deformation of the sheet metal control pot in a direction of an interior of the pot, and there is a respective indent in an outer surface of the disk-shaped pot base corresponding to the at least one stop.

2. The damping valve arrangement for a vibration damper according to claim 1, wherein the sheet metal control pot has a portion with reduced cross section formed at the disk-shaped pot base.

3. The damping valve arrangement for a vibration damper according to claim 1, wherein the at least one spring arrangement comprises a series connection of at least two disk springs connected in parallel.

4. The damping valve arrangement for a vibration damper according to claim 1, further comprising:
   a stop element; and
   a tubular guide bushing adjoining the stop element arranged between the damping piston and the disk-shaped pot base of the control arrangement,
   wherein the control piston surrounds the tubular guide bushing in circumferential direction and slides axially on an outer surface of the tubular guide bushing during a change in volume in the control space.

5. The damping valve arrangement for a vibration damper according to claim 4, wherein the stop element has a greater outer diameter than the tubular guide bushing.

6. The damping valve arrangement for a vibration damper according to claim 4, wherein the control arrangement has the stop element that limits an axial movement of the control piston in direction of the damping piston and defines a maximum pre-loading of the at least one spring arrangement.

7. The damping valve arrangement for a vibration damper according to claim 1, wherein the control arrangement has a stop element that limits an axial movement of the control piston in direction of the damping piston and defines a maximum pre-loading of the at least one spring arrangement.

8. The damping valve arrangement for a vibration damper according to claim 1, wherein the control piston has an inner extrusion edge that prevents an extrusion of a seal ring arranged between the control piston and a tubular guide bushing.

9. The damping valve arrangement for a vibration damper according to claim 8, wherein an outer extrusion edge of the control piston and the inner extrusion edge of the control piston are arranged axially substantially in a plane.

10. The damping valve arrangement for a vibration damper according to claim 1,
    wherein the control piston comprises a compensation ring arranged between the control piston and the cylindrical pot wall configured to compensate for manufacturing tolerances of the sheet metal control pot and the control piston,
    wherein the compensation ring permits a defined leakage between the control piston and the cylindrical pot wall so that the damping fluid can escape from the control space, the outlet connection being at least partially defined in this way.

11. The damping valve arrangement for a vibration damper according to claim 10, wherein the control piston has an outer extrusion edge that prevents an extrusion of the compensation ring arranged between the control piston and the sheet metal control pot.

12. The damping valve arrangement for a vibration damper according to claim 1, wherein the control piston has an outer extrusion edge that prevents an extrusion of a compensation ring arranged between the control piston and the sheet metal control pot.

13. The damping valve arrangement for a vibration damper according to claim 12, wherein an outer extrusion edge of the control piston and an inner extrusion edge of the control piston are arranged axially approximately in a plane.

14. The damping valve arrangement for a vibration damper according to claim 1, wherein an outer extrusion edge of the control piston and an inner extrusion edge of the control piston are arranged axially approximately in a plane.

15. The damping valve arrangement for a vibration damper according to claim 1, wherein the axially displaceable damping piston and the control arrangement are arranged serially inside the cylinder in a non-overlapping manner.

16. The damping valve arrangement for a vibration damper according to claim 1, wherein the at least one stop that projects from the disk-shaped pot base radially inside an outer diameter of the disk-shaped pot base.

17. A The damping valve arrangement for a vibration damper, comprising:
   a cylinder that is at least partially filled with a damping fluid;
   a piston rod;
   an axially displaceable damping piston arranged inside the cylinder, and axially secured to the piston rod that divides the cylinder into a first working space on the piston rod side and a second working space remote of the piston rod;
   at least one flow channel formed in the damping piston;
   at least one valve disk covering the at least one flow channel; and
   a control arrangement arranged at the piston rod coaxial to the damping piston, comprising:
      a sheet metal control pot with a cylindrical pot wall and a disk-shaped pot base arranged at an end of the sheet metal control pot remote of the damping piston;
      an axially displaceable control piston arranged in the sheet metal control pot and that axially limits a control space enclosed in the sheet metal control pot,
      an inlet connection that connects the first working space to the control space;
      an outlet connection that connects the control space to the second working space;
      at least one spring arrangement arranged between the control piston and the damping piston, and configured to load the at least one valve disk axially in direction of the at least one flow channel and the control piston in direction of the disk-shaped pot base with a defined spring force; and
      at least one stop that projects into the control space and axially supports the control piston at least indirectly and defines a soft damping force characteristic,
   wherein the at least one stop is produced by plastic deformation of the sheet metal control pot in a direction of an interior of the pot,
   wherein a stop element has a greater outer diameter than a tubular guide bushing.

18. The damping valve arrangement for a vibration damper according to claim 17, wherein the control arrangement has a stop element that limits an axial movement of the control piston in direction of the damping piston and defines a maximum pre-loading of the at least one spring arrangement.

* * * * *